MULTIPLE ERROR CORRECTION CIRCUITRY

Filed Oct. 30, 1957 2 Sheets-Sheet 1

INVENTORS W. D. LEWIS
A. C. ROSE

BY [signature]

ATTORNEY

MULTIPLE ERROR CORRECTION CIRCUITRY

Filed Oct. 30, 1957 2 Sheets-Sheet 2

INVENTORS W. D. LEWIS
A. C. ROSE
BY [signature]
ATTORNEY

United States Patent Office 2,954,433

Patented Sept. 27, 1960

2,954,433

MULTIPLE ERROR CORRECTION CIRCUITRY

Willard D. Lewis, Mendham, and Alan C. Rose, Summit, N.J., assignors to Bell Telephone Laboratories, Incorporated, New York, N.Y., a corporation of New York Filed Oct. 30, 1957, Ser. No. 693,452

6 Claims. (Cl. 178—23)

This invention relates to digital error detection and correction circuits.

In the transmission of digital signals over imperfect data links, it is often desirable to detect or correct errors in transmission. In the most elementary circuits of this type, each digit may be sent twice to provide error detection, or each digit may be sent three times to permit error correction on a two-out-of-three basis. More sophisticated error detection and correction circuits involving less redundancy have also been proposed. Thus, for example, as disclosed in R.W. Hamming et al. Reissue Patent 23,601, granted December 23, 1952, an additional check digit may be added to a binary code group to make the sum of the digits odd or even. Such an additional digit is called a parity check digit. At the receiver, a change in parity indicates that an error has been introduced in the code group. Through the use of additional parity check digits, the erroneous digit may be uniquely identified and corrected. Another disclosure relating to digital error detection and correction appears in an article entitled, "Error Free Coding" by Peter Elias, pages 29 through 37, Transactions of the I.R.E., Professional Group on Information Theory–4, September, 1954.

It has recently been determined that errors tend to occur in bursts. Thus, for example, if the normal rate of errors on a given data link is 1 in 100,000, the probability of the occurrence of a second error immediately after the first is much larger. For example, the probability may be in the order of 1 in 10. In a simple detection circuit using one parity check digit for a group of binary signals, double errors would remain undetected, because both the original code group and the erroneous code group would both be odd or even. In addition, many of the circuits of the prior art are relatively difficult to instrument, and the error correction circuits have characteristically required a relatively high ratio of check digits to information digits.

It is an object of the inventor to improve and simplify error detection or correction circuitry.

Another object of the inventor is to increase the error correction capabilities of data processing or transmitting apparatus.

In one illustrative embodiment of the present invention, the foregoing objects may be obtained through the use of two groups of parity check digits. As more fully set forth in application Serial No. 693,451, filed October 30, 1957, of W. D. Lewis, the first group of parity check digits checks the parity of successive interleaved groups of information digits which are spaced apart by a predetermined number of digits which may be designated "N"; the second group of parity check digits checks sets of interleaved digits which are spaced $N+1$ digits apart. Thus, each information digit is included in two independent parity checks, permitting immediate correction of single errors. In addition, we have discovered that it is possible to correct certain multiple errors and to detect many bursts of errors.

In accordance with a feature of the invention, a data handling system for digital signals including redundancy includes circuitry for identifying a group of digits in which are possibly included multiple errors, an additional circuit for identifying adjacent digits in the group of possibly erroneous digits, and circuitry for correcting these adjacent digits.

In accordance with another feature of the invention, the decoder in a digital data processing system includes circuitry for detecting the position of single errors and associated circuitry for detecting the position of multiple errors, and additional circuitry responsive to the presence of multiple errors for enabling the multiple error position detection circuitry.

A complete understanding of this invention and of these and various other features thereof may be gained from consideration of the following detailed description, and the accompanying drawing, in which.

Figure 1:
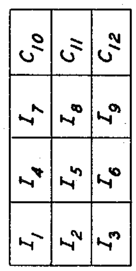
Figs. 1 and 2 are diagrams indicating the parity check groups included in a representative example of the instrumentation of the invention.
Figure 2:
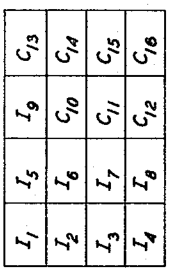

In the drawing, Figs. 1 and 2 are diagrams indicating the code groups which are employed in one illustrative implementation of the invention. In Figs. 1 and 2, the symbols $I_1$ through $I_9$ represent information digits, and the symbols $C_{10}$ through $C_{16}$ represent check digits. Although the example chosen for illustration utilizes only nine information digits and seven additional check digits for the sake of simplicity, the present invention is applicable to situations in which larger numbers of information and check digits are included in blocks of binary information.

In Fig. 1, the check digit $C_{10}$ indicates the parity of the information digits $I_1$, $I_4$, and $I_7$. This may be expressed mathematically by either of the following two equations.

$$I_1+I_4+I_7+C_{10}=O \text{ Mod } 2 \quad (1)$$

$$I_1+I_4+I_7+C_{10}=1 \text{ Mod } 2 \quad (2)$$

Equation 1 set forth above represents even parity conditions, and Equation 2 set forth above represents odd parity condition. The expressions "0 Mod 2" and "1 Mod 2" are mathematical expressions indicating that the sum is even or odd, respectively. With regard to the array shown in Fig. 1, it may be noted that the digits checked by $C_{10}$ are spaced three digits apart. Similarly, the check groups corresponding to the second and third horizontal rows in Fig. 1 include digits which are also spaced three digits apart.

Fig. 2 shows a second array of parity check groups which are formed by adding the check digits $C_{13}$ through $C_{16}$ to a re-arranged version of the first twelve digits of the code group. In Fig. 2, the check groups indicated by the horizontal rows each include four digits which are spaced four digits apart. Thus, the check digit $C_{13}$ forms a parity group with digits $I_1$, $I_5$, and $I_9$, and the additional check digits $C_{14}$, $C_{15}$, and $C_{16}$ are chosen to be in parity relationship with the three additional digits in the second, third, and fourth rows, respectively, of the matrix of Fig. 2.

Figure 3:
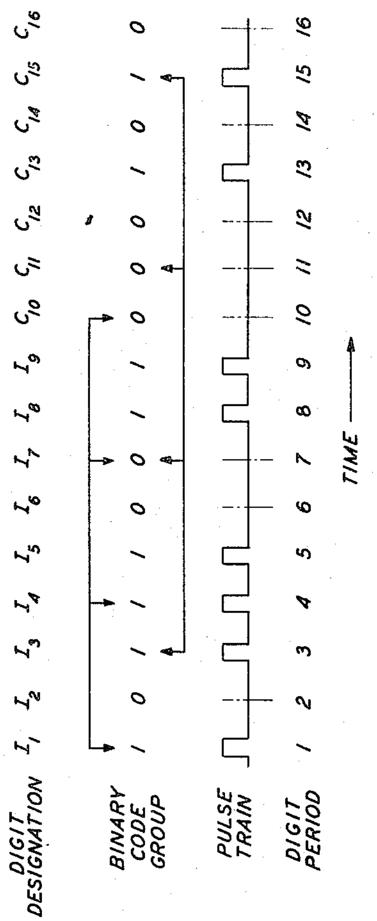
Fig. 3 is a diagram indicating the serial mode of operation of the present data processing apparatus.

The diagram of Fig. 3 is designed to indicate the serial mode of operation employed in the illustrative circuit implementation of the present invention. In Fig. 3, the sixteen binary digits are shown as the digits $I_1$ through $I_9$ and $C_{10}$ through $C_{16}$ in the upper horizontal row. In the second row of Fig. 3, a series of symbols representing information and check digits have been added. The horizontal line with four downwardly extending arrows indicates a parity check group corresponding to the first row in Fig. 1. In this example, $C_{10}$ has been chosen to give an even parity check. Thus, with the sum of digits $I_1$, $I_4$ and $I_7$ being even, the check digit $C_{10}$ must be equal to "0." If $I_7$ were changed from a "0" to a "1," the check digit $C_{10}$ would also be a "1" to make the sum even. The line having four upwardly extending arrows corresponds to the check group which appears in the third row of Fig. 2. In this case, the sum of the digits $I_3$, $I_7$, and $C_{11}$ is "1," and is odd, so $C_{15}$ must also be a "1" to produce an even sum. The other parity check digits $C_{11}$ through $C_{14}$ and $C_{16}$ are formed in the manner indicated above for check digits $C_{10}$ and $C_{15}$.

In serial binary data processing apparatus, binary information is characteristically represented by the presence or absence of pulses in successive digit periods. These digit periods, numbered 1 through 16, are indicated at the bottom of Fig. 3. The pulse train shown in Fig. 3 includes a pulse in those digit periods in which a "1" appears in the binary representation, and has no pulse present in digit periods in which a "0" appears in the binary representation. The complete pulse train shown in Fig. 3 therefore corresponds to the binary code group shown directly above the pulse train.

Figure 4:
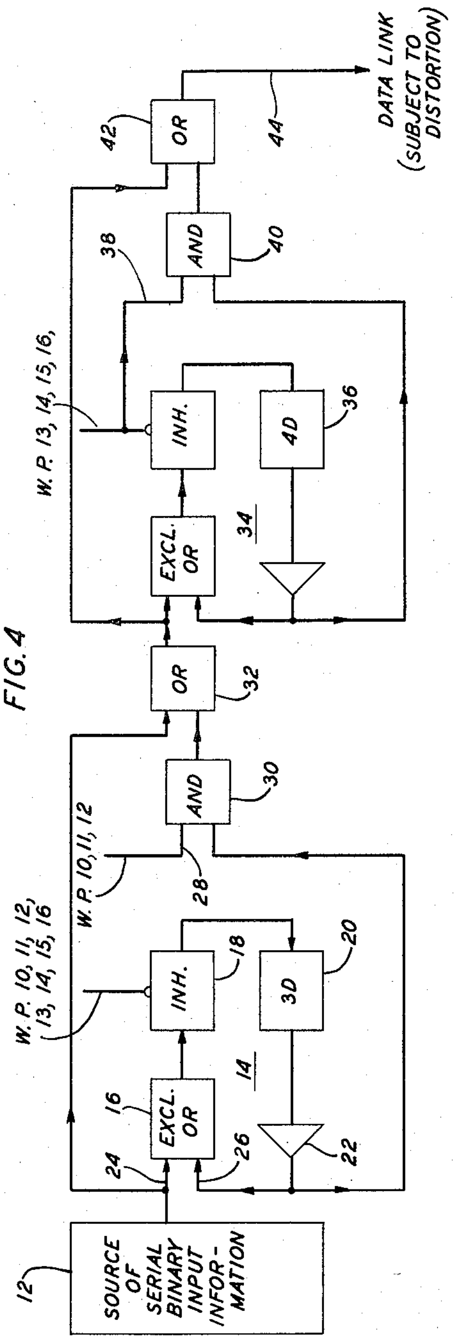
Fig. 4 is a logic circuit diagram of an encoder of the type described in the priorly mentioned Lewis application and which may be utilized to provide the check signals for employment in embodiments of the present invention.

In Fig. 4 there is depicted a serial binary data processing circuit as disclosed in the application of W. D. Lewis cited above and which performs the encoding function described in connection with Figs. 1 through 3. In the logic circuit diagrams of Figs. 4 and 5, a number of logic circuit building blocks are employed. These may take any of many known forms. For example, they may be implemented in accordance with an article by J. H. Felker entitled, "Regenerative Amplifier for Digital Computer Applications," which appeared at pages 1584 through 1596 of the November 1952 issue of the Proceedings of the I.R.E., volume 40, No. 11.

Some of the building blocks which are employed include the AND unit, which produces output signals when all input leads are energized; the OR unit, which produces output pulses when any or all input leads are energized; and the inhibit unit which has at least one normal input lead and an inhibiting input lead marked by a small semicircle at the point where it is connected to the block representing the inhibit unit. A pulse applied to a single normal input lead is transmitted through the inhibit unit, while a pulse applied to the inhibiting input lead overrides other input signals and blocks output signals. In serial digital computing circuits, delay circuits having delay equal to various numbers of digit periods are often required. Such circuits are indicated by logic blocks including the letter D and a number indicating the number of digit periods of delay provided by the delay line. A memory unit, as disclosed in the Felker article, may include a delay loop having one digit period of delay. It can be set to either the "0" state or the "1" state. When it is in the "0" state, no output pulses are produced; however, when it is in the "1" state, circulating pulses produce output pulses in successive digit periods until the memory unit is reset to the "0" state. An exclusive-OR circuit is employed as a block in the present circuits. Such a circuit produces an output signal when either of its two input leads is energized but not when both of them are energized. It may be implemented, for example, through the use of two parallel inhibit units having their output leads connected to an OR circuit. Each input lead is connected to a normal input of one of the inhibit units and an inhibiting input terminal of the other circuit.

Figure 5:
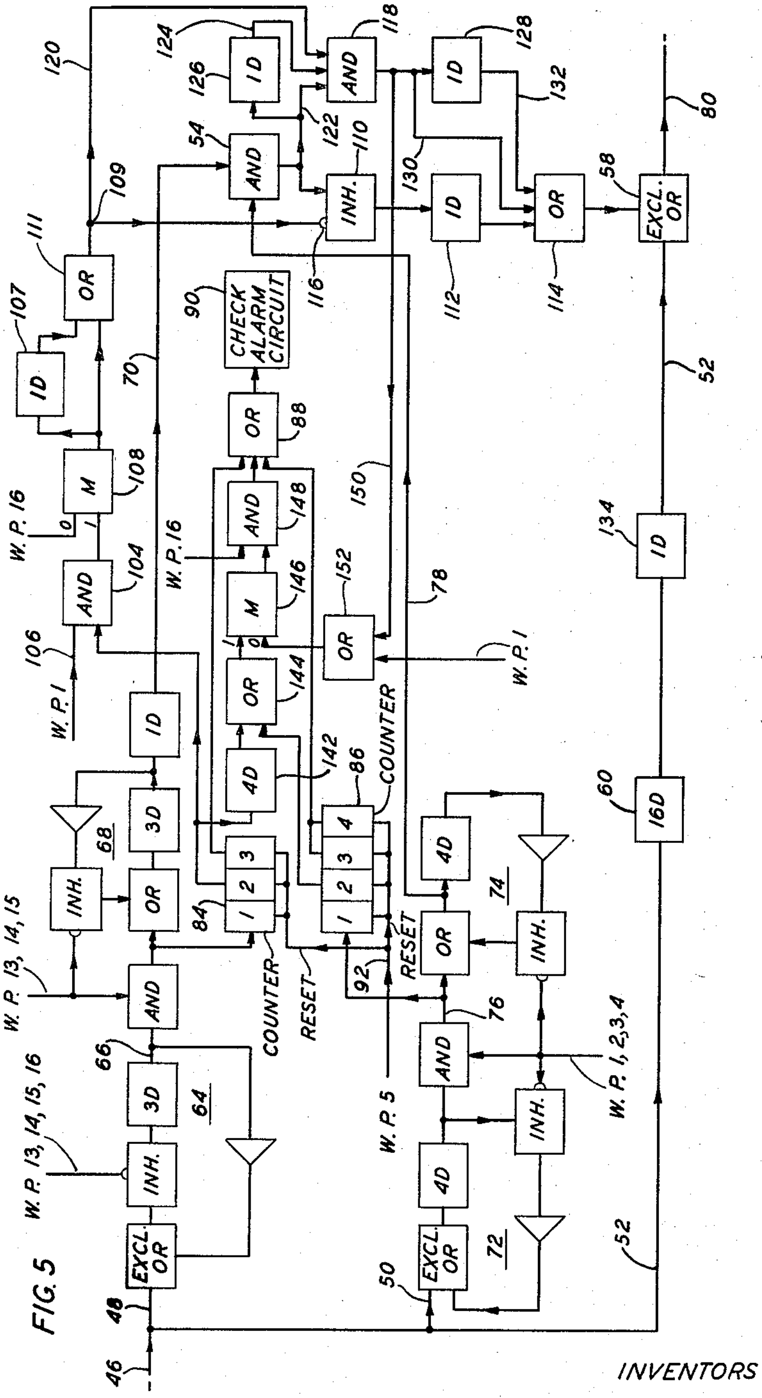
Fig. 5 is a logic circuit diagram of a decoder in accordance with one illustrative embodiment of the invention, which may be employed with the encoder of Fig. 4.

In the circuits of Figs. 4 and 5 it will be assumed that properly timed pulses are available in any desired digit period. These pulses may, for example, be obtained through the use of a sixteen-stage ring counter connected to the output of a master timing pulse source. Properly timed "word pulses" appearing once every sixteen digit periods in any desired time slot are then available at the output leads of the ring counter. As disclosed in the Felker article, it is also conventional to employ master timing, or "clock," pulses for timing in connection with many of the logic circuit components.

In Fig. 4, information digits are supplied from the signal source 12. The input digital signals are in the form of a pulse train in the first nine digit periods of the sixteen-digit period word shown in Fig. 3. The input information is applied to the delay loop 14 including the exclusive-OR circuit 16, the inhibit unit 18, the delay circuit 20, and the pulse regenerator 22. It is to be understood that the pulse regenerator may be included in one of the logic circuits. In addition, it is assumed that the logic and pulse regeneration circuitry introduces no delay, and that all of the delay is introduced by the delay line 20. The delay loop 14 therefore includes three digit periods of delay.

As the input information digits circulate through the delay loop 14, parity check information is developed in the following manner. In the first digit period, information digit $I_1$ is applied to input lead 24 of the exclusive-OR circuit 16. Following three digit periods, the pulse representing the digit $I_1$ appears at the other input 26 to the exclusive-OR circuit 16. Simultaneously with the arrival of signal $I_1$ on lead 26, the fourth information pulse $I_4$ appears at input lead 24 to the circuit 16. In view of the coincident inputs on leads 24 and 26, no output signal appears at the output of the OR circuit. Following three more digit periods, input signal $I_7$ appears on lead 24 and is combined with the sum Mod 2 of digits $I_1$ and $I_4$. In view of the fact that information digit $I_7$ is a "0," the resulting sum Mod 2 of digits $I_1$, $I_4$, and $I_7$ is still equal to "0."

During the digit periods between the calculation of the sum as mentioned above, other parity check digits are also being computed. While the exclusive-OR circuit 16 is performing logic operations on information appearing at leads 24 and 26, additional parity information is stored in the delay circuit 20. Following the application of the final information digit $I_9$ to the exclusive-OR circuit 16, the three check digits $C_{10}$, $C_{11}$, and $C_{12}$ are stored in the delay circuit 20. At this point, three pulses designated word pulses 10, 11, and 12 are applied to input lead 28 of the AND circuit 30. The three check bits $C_{10}$, $C_{11}$, and $C_{12}$ are therefore gated through AND circuit 30, and are combined with the original nine information digits in the OR circuit 32. The additional check digits $C_{13}$ through $C_{16}$ are developed in the delay loop 34, which includes substantially the same components as are included in delay loop 14. However, the delay circuit 36 included in delay loop 34 has four digit periods of delay, as contrasted with the three digit periods of delay included in circuit 20 associated with delay loop 14. This corresponds to the sampling of every fourth digit period indicated in Fig. 2, as contrasted with the sampling of every third digit period indicated in Fig. 1. Following the development of check bits $C_{13}$ through $C_{16}$, the check information is gated out of delay loop 34 by the application of four pulses in digit periods 13, 14, 15, and 16 to control lead 38 associated with AND unit 40. The check digits $C_{13}$ through $C_{16}$ are combined with the information digits and the other check digits in the OR circuit 42.

The output lead 44 from the OR circuit 42 is coupled to a data link which is subject to noise or other distortion. This data link may include a long transmission channel, for example, or an imperfect memory circuit associated with a data processing system.

Fig. 5 is a logic circuit showing one illustrative instrumentation of a decoder in accordance with our invention for use with the encoder circuit of Fig. 4. In Fig. 5, the received signal is coupled from the input lead 46 to three branch circuits 48, 50, and 52. The logic circuitry associated with lead 48 determines the validity of the parity check groups including check digits $C_{10}$, $C_{11}$, and $C_{12}$. Similarly, the logic circuitry associated with lead 50 checks the validity of parity check groups associated with digits $C_{13}$ through $C_{16}$.

Concurrent output signals from the two checking circuits are indicated by output signals from the AND circuit 54. These output signals are utilized to correct the input signals in a manner to be described in detail below. In brief, however, it may be noted that the received signals have been routed on lead 52 through the sixteen digit delay unit 60 and the one digit delay unit 134 to the exclusive-OR circuit 58. Signals from the output of AND unit 54 are coupled through logic circuits to the OR unit 114. Correction pulses at the output of the OR unit 114 are applied to the exclusive-OR circuit 58, and correct erroneously received digital signals by reversing the bit which is applied on lead 52 to logic unit 58 concurrently with the correction pulse.

In accordance with the present invention, both single errors and the most common form of multiple errors may be corrected. This is in contrast to the decoder disclosed in W. D. Lewis application Serial No. 693,451, noted above, in which single errors are corrected and many multiple errors are detected. The correction of both single errors and adjacent double errors is accomplished advantageously in the circuit of Fig. 5 through the use of error identification and correction circuitry which operates in two distinct modes. The error identification circuits are connected between AND circuit 54 and OR circuit 114. When single errors are present, output pulses from AND circuit 54 are transmitted directly through inhibit unit 110, and the one digit delay unit 112 to the OR circuit 114. When multiple errors occur, however, the inhibit unit 110 is blocked and signals from AND unit 54 are transmitted through the circuit including AND unit 118 and the two delay circuits 126 and 128. This last mentioned circuit is responsive to successive pulses at the output of AND circuit 54 to correct adjacent errors in the received code group.

Figure 6:
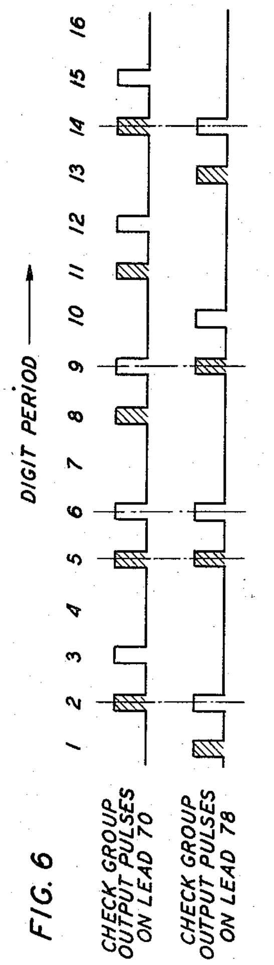
Fig. 6 is a pulse diagram indicating the mode of operation of the circuit of Fig. 5.

The operation of the parity group circuits associated with leads 48 and 50 will now be considered in somewhat greater detail, partly by reference to Fig. 6. Later in the detailed description consideration will be given to the distinct modes of operation of the error detection and correction circuits when single and multiple errors are present. Initially, it will be assumed that digit 5 has been received incorrectly. As indicated in Figs. 1 and 2, this produces an error in the check group including digit $C_{11}$, and in the check group including digit $C_{13}$. At the output, the parity group check circuit associated with lead 48 includes the delay loop 64 which is similar in its mode of operation to the delay loop 14 of Fig. 4. However, it is operated for one additional cycle of three digit periods to include the check bits $C_{10}$ through $C_{12}$. Because an even parity check is employed, the absence of signals at lead 66 during digit periods 13, 14, and 15, when the parity group check information is gated out, indicates that no errors have been introduced into the transmitted code group. However, if any of the code groups include an erroneous digit, a pulse appears in the corresponding time slot. Thus, for example, a pulse on lead 66 during digit period 14 indicates an error in the group including check digit $C_{11}$. Similarly, errors in the parity check groups shown in the first and third rows of Fig. 1 would produce pulses on lead 66 during digit periods 13 and 15, respectively.

These error marking pulses are transferred to the delay loop 68, and are circulated in this loop during the next word period. Assuming, as mentioned above, that information digit $I_5$ has been received incorrectly, a pulse appears on lead 66 during digit period 14, is transferred to delay loop 68, and appears on lead 70 during digit periods 2, 5, 8, and 11 of the next subsequent word. This pulse pattern on lead 70 is shown by the shaded pulses in the upper pulse train in the diagram of Fig. 6.

The parity check group circuit associated with lead 50 includes a first delay loop 72 and a second delay loop 74. The delay loop 72 corresponds to the delay loop 34 of Fig. 4 in much the same manner that the delay loop 34 corresponds to the delay loop 14 in Fig. 4. Accordingly, all sixteen digits in the transmitted code group are applied to the four digit period delay loop 72, and the pulses indicating errors in successive parity check groups are transferred to delay loop 74 on lead 76 during digit periods 1, 2, 3, and 4 of the next subsequent word period. The delay loop 74 has four digit periods of delay, and indications of erroneous digits are circulated in delay loop 74 in much the same manner as in delay loop 68. Following the assumption that the digit $I_5$ was changed in the course of transmission from the encoder of Fig. 4 to the decoder of Fig. 5, the parity check group shown in the first row of Fig. 2 and associated with check digit $C_{13}$ produces a parity check failure. This failure produces a pulse during the first digit period on lead 76. This pulse is circulated in delay loop 74 and appears on lead 78 in the first, fifth, ninth and thirteenth digit periods. This group of pulses appears as the shaded set of pulses in the lower pulse train in Fig. 6.

In comparing the two sets of shaded pulses shown in Fig. 6, it may be seen that a coincidence of the shaded pulses on leads 70 and 78 occurs only during digit period 5. Accordingly, with reference to Fig. 5 a pulse appears at the output of the AND circuit 54 only during the fifth digit period. It is again noted that the incoming pulse group has been delayed sixteen digit periods by the delay circuit 60 and an additional digit period by delay circuit 134. Accordingly, with the output pulse from AND circuit 54 passing through the one digit period delay unit 112, digit $I_5$ appears on lead 52 at one input of the exclusive-OR circuit 58 concurrently with the pulse from the AND circuit 54. The binary value of digit $I_5$, is therefore changed, and a corrected pulse group is applied to the output channel 80.

As mentioned above, the circuit of Fig. 5 also includes arrangements for correcting adjacent double errors in accordance with the present invention. The underlying concept behind the mode of operation of the double error correction circuit of Fig. 5 may best be understood by reference to the diagrams of Figs. 1 and 2. It will be assumed, for the purposes of the following discussion, that the successive information digits $I_5$ and $I_6$ have been changed in the course of transmission. With these two digits in error, the check groups including digits $C_{11}$ and $C_{12}$ will have a parity failure, as will the check groups including the check digits $C_{13}$ and $C_{14}$. It has been shown above that the check group error detection circuits are capable of determining in which check group errors occur. However, in examining the second two rows of Fig. 1 and the first two rows of Fig. 2, it is apparent that there is insufficient data available to permit the correction of any given pair of digits. Thus, for example, in addition to the consecutive digits $I_5$ and $I_6$ which cause the failure of the four parity check groups including digits $C_{11}$, $C_{12}$, $C_{13}$ and $C_{14}$, respectively, errors in digits $I_2$ and $I_9$ could also have produced this combination of parity group failures. It is, however, known that multiple errors are most likely to occur during successive digit periods. The circuit of Fig. 5 is designed to take advantage of this fact and to correct successive digits included among a group of possibly erroneous digits. Thus, for example, in the case discussed above, the circuit of Fig. 5 is designed to correct digits 5 and 6 and to leave unchanged the other two possibly erroneous digits $I_2$ and $I_9$.

Concerning the operation of the circuit of Fig. 5, the transfer of parity check pulses from delay loop 64 to delay loop 68 and from delay loop 72 to delay loop 74 has been discussed above. Normally, the number of pulses included in either of these transfer operations indicates the number of errors in a received code group. The number of pulses transferred from loop 64 to loop 68 is registered in counter 84, and the number of pulses transferred from loop 72 to loop 74 is registered in counter 86. Signals from counters 84 and 86 are employed both to control the multiple error correction circuitry mentioned above and to energize the alarm circuit 90. Pulses are supplied on lead 92 during the fifth digit period of each word to reset the counter circuits 84 and 86.

The alarm circuit 90 is energized when multiple errors are detected which are beyond the correction capabilities of the circuit of Fig. 5. Thus, because the circuit of Fig. 5 is incapable of correcting any triple or quadruple errors, the third stage of both counters and the fourth stage of counter 86 are coupled to OR circuit 88 at the input to the alarm circuit 90. The alarm circuit 90 is also energized, if the double errors which occur are not the adjacent double errors which can be corrected.

Returning to the matter of the correction of adjacent errors, the energization of the second stage of the counter circuit 84 is detected by the AND circuit 104. The state of the second stage of the counter circuit is sampled by the application of a pulse to input lead 106 of the AND circuit 104 during digit period 1. An output pulse from AND circuit 104 sets memory circuit 108 to the "1" state. In this condition output pulses are produced during digit periods 1 through 15 of the following word period. It may be noted that a reset pulse is applied to the reset input of the memory circuit 108 during digit period 16 of each word. The one-digit period delay circuit 107 and the OR circuit 111 are included at the output of memory circuit 108 to provide an output pulse at control point 109 during digit period 16 of any word in which memory unit 108 is energized.

Upon the energization of the memory circuit 108, the circuitry interconnecting the AND circuit 54 and the exclusive-OR circuit 58 is changed, so that only successive pulses from the AND circuit 54 are gated through to the exclusive-OR circuit 58. In the absence of pulses from memory circuit 108, each pulse from the AND circuit 54 is gated through the inhibit circuit 110, the one-digit delay circuit 112, and the OR circuit 114, to the exclusive-OR circuit 58, in the manner discussed above. Upon the occurrence of a series of pulses at the output of the memory circuit 108, however, the inhibiting input terminal 116 of inhibit unit 110 is enabled to block the flow of single pulses through the circuit chain mentioned above. In addition, the AND circuit 118 is enabled by the application of input pulses to lead 120. Single pulses from the AND circuit 54 are not gated through AND circuit 118 in view of the requirement that all three input leads 120, 122, and 124 must be energized to produce an output pulse. The one-digit delay circuit 126 coupled between leads 122 and 124 establishes the requirement of two successive output pulses from AND circuit 54 for the energization of AND circuit 118. When two consecutive pulses occur, one pulse is transmitted through AND unit 118. Through the use of the additional one-digit period delay circuit 128, the single output pulse from AND circuit 118 is transformed back into a pair of successive input pulses on leads 130 and 132 at the input to the OR circuit 114. To synchronize the timing of the arrival of correction pulses at the exclusive-OR circuit 58, the additional one-digit period delay circuit 134 is provided in the digital input circuit 52 to the correction circuit 58.

The mode of operation of the circuit of Fig. 5 upon the occurrence of a double error is indicated in Fig. 6. It is still assumed that information digits $I_5$ and $I_6$ were erroneously received at the decoder of Fig. 5. Pairs of pulses, as indicated by all of the pulses in the upper pulse train of Fig. 6, therefore appear on lead 70 at the input to the AND circuit 54. Similarly, the pairs of shaded and unshaded pulses shown in the lower pulse train of Fig. 6 appear on lead 78 at the input to the AND circuit 54. It may be noted that coincident pulses appear on leads 70 and 78 during digit periods 2, 5, 6, and 9 as well as during digit period 14, thus corroborating the original analysis of Figs. 1 and 2. However, because two error pulses are transferred from delay loop 64 to delay loop 68, the counter circuit 84 is set to its second state. The memory circuit 108 is therefore energized, and the error correction circuitry is set to its "double error correction" mode of operation. Under these conditions, only the successive pulses in digit periods 5 and 6 are effectively transmitted through to the exclusive-OR circuit 58 in Fig. 5. Accordingly, the desired correction of information digits $I_5$ and $I_6$ is effected.

It is possible that double errors which are not consecutive may occur within a code group. Thus, for example, if information digits $I_1$ and $I_3$ are erroneously transmitted, no consecutive output pulses appear at the output of the AND circuit 54. Under circumstances of this type, it is desirable to apply a signal to the check violation alarm circuit 90. This is accomplished by circuitry including the four-digit delay circuit 142, the OR circuit 144, the memory circuit 146, and the AND circuit 148.

In general, the mode of operation of this circuit involves the registration of signal combinations in which two or more errors occur in the memory circuit 146. If a double error is corrected, as indicated by a pulse on lead 150 from the AND circuit 118, the memory circuit 146 is reset to "0." If no pulse is applied to lead 150, a word period pulse in the sixteenth digit period transmits a signal through the AND circuit 148 and the OR circuit 88 to the alarm circuit 90. The memory circuit 146 is reset to the "0" state by a word pulse in the first digit period applied to the OR circuit 152 and thus to the "set 0" input of the memory circuit 146. The four-digit delay circuit 142 is provided to delay the signals from the second stage of counter 84 and to permit full utilization of output signals from the AND circuit 118 without requiring many additional logic circuits.

In the encoder and decoder circuits of Figs. 4 and 5, it is assumed that synchronization signals are applied to both of the two circuits, with the master control being located at one terminal and a synchronization channel being provided. Alternatively, special synchronization signals may be sent over the information channel, and circuitry may be provided in accordance with conventional practice to maintain synchronism of encoder and decoder circuits.

In the example of the invention shown in the drawings and discussed above, the original group of information digits number nine, and the digits of the final code group number sixteen. Thus, in the selected example, nine information digits and seven check digits are included in each code group. The redundancy of a message made up of such code groups is unnecessarily high, and can readily be reduced by increasing the size of the array. In this regard, it is particularly to be noted that increasing the size of the array requires only that the delay of a relatively small number of delay circuits be increased.

It may also be noted that the selected number of information digits is the square of an integer. This selection is made to reduce the redundancy of the completed message, as the ratio of check digits to total digits is roughly proportional to the ratio of one-half the periphery of a rectangle (representing the matrix) to the area of the rectangle. Thus, in Fig. 1 it would be possible to use a matrix of information digits which is not square. However, if the original array departs significantly from a square the redundancy of the message tends to increase for matrices including a given number of digits.

In the foregoing description of Fig. 5, it has been demonstrated that the higher probability of consecutive errors as compared with errors which are spaced apart by a few digit periods may be utilized to provide information for the optimum reconstitution of erroneous received digital signals. It is evident that the same principle may be utilized to modify other systems which are designed for single error correction and multiple error detection, for example, by the addition of circuitry for at least correcting double adjacent errors.

It is to be understood that the above-described arrangements are illustrative of the application of the principles of the invention. Numerous other arrangements may be devised by those skilled in the art without departing from the spirit and scope of the invention.

What is claimed is:

1. A digital decoder circuit comprising first and second error check circuits, a correction circuit, means for applying received signals to said first and second check circuits and to said correction circuit, said first check circuit including a first register having a predetermined length and means for circulating error signals derived from a received message in said first register, said second check circuit including a second register having a different predetermined length and means for circulating error signals derived from a received message in said second register, single error detection means responsive to the simultaneous occurrence of error signals at the outputs of both said first and said second registers for actuating said correction circuit, normally disabled adjacent error detection means responsive to the simultaneous occurrence of consecutive error signals at the outputs of both said first and said second registers for actuating said correction circuit, and means including a counter for disabling said single error detection means and enabling said adjacent error detection means upon the occurrence of double errors.

2. In a decoder for digital messages including redundancy, means for identifying a group of digits in which are possibly included multiple errors, means for further identifying adjacent erroneous digits in said group of possibly erroneous digits, and means for correcting said adjacent digits.

3. A digital decoder circuit comprising first and second error check circuits, a correction circuit, means for applying signals received in successive digit periods to said first and second check circuits and to said correction circuit, said first check circuit including a first delay loop having a predetermined number of digit periods of delay and means for circulating error signals derived from a received message in said first delay loop, said second check circuit including a second delay loop having a different predetermined number of digit periods of delay and means for circulating error signals derived from a received message in said second delay loop, single error detection means responsive to the simultaneous occurrence of error signals at the outputs of both said first and said second delay loops for actuating said correction circuit, normally disabled double error detection means responsive to the simultaneous occurrence of consecutive error signals at the outputs of both said first and said second delay loops for actuating said correction circuit, and means for disabling said single error detection means and enabling said double error detection means upon the occurrence of double errors.

4. In combination, a decoder for receiving digital signals including information digits and parity check digits, correction circuit means, parity check circuitry for identifying the position of a single erroneous digit in a group of received digital signals and for actuating said correction circuit means to correct the erroneous digit, and partity check circuitry for identifying the positions of a group of digits in which are possibly included multiple errors, and means for identifying adjacent erroneous digits in said group and for actuating said correction circuit means in accordance with said last-mentioned identification.

5. An error correcting and detecting circuit comprising means for recognizing the occurrence of a single erroneous digit in a train of digits, means for recognizing the occurrence of multiple erroneous digits in a single group of digits, means for correcting said single erroneous digit and said multiple erroneous digits if occurring in successive digit intervals, an alarm circuit, and means for enabling said alarm circuit on occurrence of multiple erroneous digits in a single group when not in successive digit intervals.

6. An error correction circuit comprising correcting means, means for actuating said correcting means on detetion of a single erroneous digit in a train of digits, means for disabling said actuating means on detection of more than a single erroneous digit in a single group of digits of said train of digits, and means for actuating said correcting means in successive digit intervals on detection of erroneous digits in successive digit intervals.

References Cited in the file of this patent

UNITED STATES PATENTS

| | | |
|---|---|---|
| 2,552,629 | Hamming et al. | May 15, 1951 |
| 2,653,996 | Wright | Sept. 29, 1953 |